United States Patent [19]

Eskeli

[11] 4,012,912
[45] Mar. 22, 1977

[54] TURBINE
[76] Inventor: Michael Eskeli, 7994-41 Locke Lee, Houston, Tex. 77042
[22] Filed: Jan. 22, 1976
[21] Appl. No.: 651,441

Related U.S. Application Data
[63] Continuation-in-part of Ser. No. 566,373, April 9, 1975, Pat. No. 3,949,557.
[52] U.S. Cl. ..................................... 60/682; 415/1; 415/178
[51] Int. Cl.² .......................................... F01K 25/02
[58] Field of Search ............. 60/682, 650; 415/178, 415/1

[56] References Cited
UNITED STATES PATENTS

| 3,761,195 | 9/1973 | Eskeli | 415/178 |
| 3,834,179 | 9/1974 | Eskeli | 60/682 |
| 3,926,010 | 12/1975 | Eskeli | 415/178 |

Primary Examiner—Martin P. Schwadron
Assistant Examiner—Abraham Hershkovitz

[57] ABSTRACT

A method and apparatus for the generation of power wherein a working fluid is compressed within outward extending rotor passages, and then passed inward in other rotor passages with accompanying expansion and deceleration, with work being generated by the decelerating fluid. Heat may be added into the working fluid near the rotor periphery, and in closed rotors, heat is removed from the working fluid after expansion. A regenerator also may be used mounted on the rotor exchanging heat between two streams of the working fluid. The working fluid passages during the deceleration are curved backward, while the working fluid passages for acceleration are usually radial. The working fluid may be either a liquid or gas, and the heating fluid and the cooling fluid may also be either a liquid or gas.

5 Claims, 5 Drawing Figures

TURBINE

CROSS REFERENCES TO RELATED APPLICATIONS

This application is a continuation-in-part application of "Turbine," Ser. No. 566,373, filed 4-9-75 now U.S. Pat. No. 3,949,557.

BACKGROUND OF THE INVENTION

This invention relates to power generators where a working fluid is circulated from a higher energy level to lower energy level, generating power.

In my earlier U.S. Pat. Nos. 3,874,190 and 3,854,841, I had described a closed and open type turbines, and using centrifuge design. These turbines used forward oriented nozzles within the rotor; in the apparatus disclosed herein, such nozzles have been replaced by other methods.

SUMMARY OF THE INVENTION

It is an object of this invention to provide a single rotor centrifuge type turbine stage, where vanes or fins, with suitable contours, are used to extract power from the working fluid, using either open type or closed type rotor.

DESCRIPTION OF PREFERRED EMBODIMENTS

Figure 1:
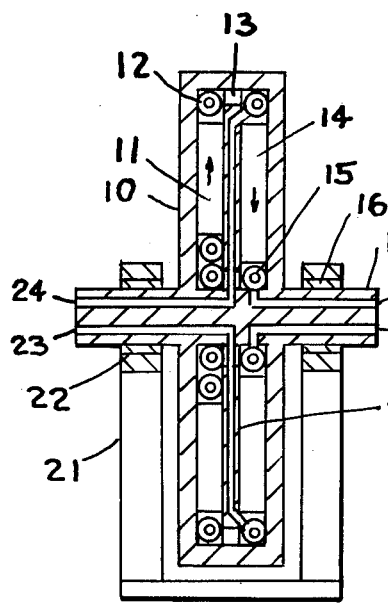
FIG. 1 is a cross section and
FIG. 2 is an end view of a closed type rotor.

Referring to FIG. 1, there is shown a cross section of one form of the unit. 10 is rotor supported by bearings 16 and 22, shaft 17 and base 21. 12 is a heat supply heat exchanger and 15 is cooling heat exchanger, 14 and 11 are vanes or fins, 18 and 19 are coolant entry and exit, 20 is dividing wall, 23 and 24 are heating fluid entry and exit, and 13 is a working fluid passage which may be used to regulate the flow of working fluid within the rotor.

Figure 2:
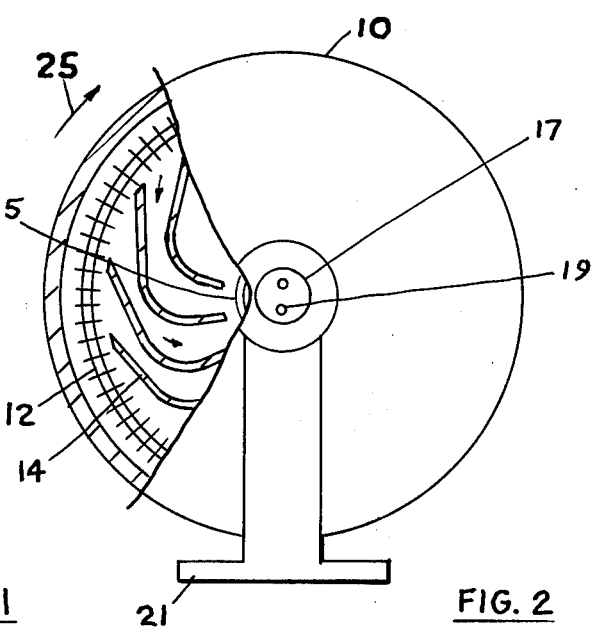

In FIG. 2, an end view of the unit of FIG. 1 is shown. 10 is rotor, 17 is shaft, 19 is coolant passage, 21 is base, 14 are vanes oriented slope away from the direction of rotation as indicated by arrow 25, while simultaneously passing the working fluid inwardly. 12 is heating heat exchanger, and 15 is cooling heat exchanger.

Figure 3:
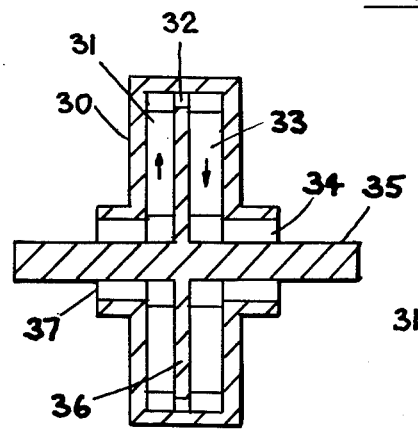
FIG. 3 is a cross section and
FIG. 4 is an end view of an open type rotor.

In FIG. 3, a rotor for a unit using open cycle is used, where the working fluid enters and leaves the rotor. 30 is rotor, 31 is vane in outwardly extending passage, 32 is fluid passage, 33 is vane in passage for inward bound working fluid, 34 is working fluid exit, 35 is rotor shaft, 36 is rotor internal divider and 37 is working fluid entry into rotor.

Figure 4:
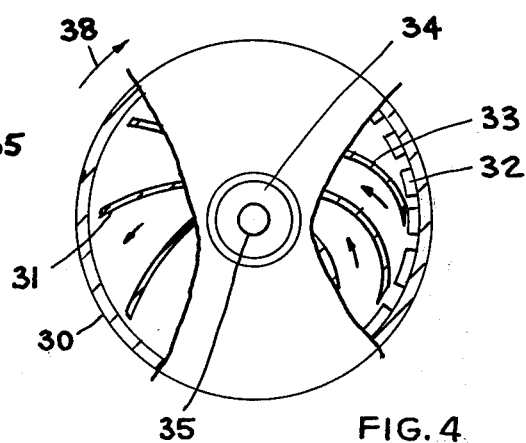

In FIG. 4, an end view of the unit of FIG. 3 is shown. 30 is rotor, 35 is shaft, 31 are vanes in the passages for outward bound fluid, and are shown here to be curved backward, when the rotor rotates in the direction shown by indicator 38. After passing openings 32, the working fluid passes inward with vanes 33 providing guidance, and then leaving via exit 34. Vanes 33 are curved as indicated, with this curvature being away from the direction of rotation, thus the working fluid provides thrust against the rotor components as it decelerates when passing inward toward the rotor center.

Figure 5:
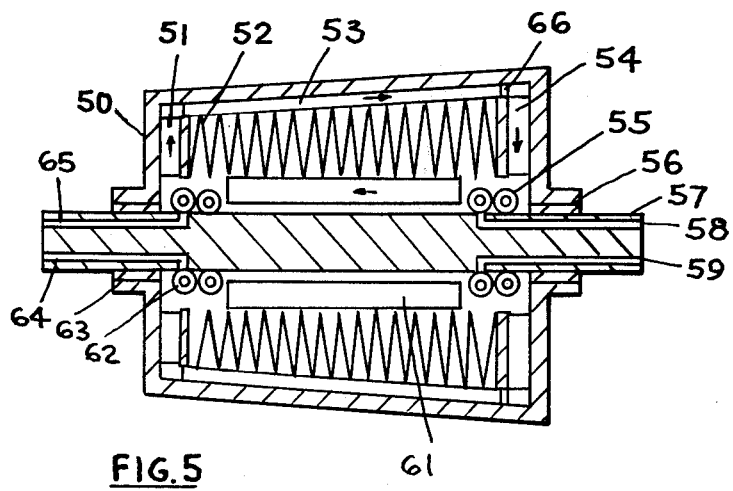
FIG. 5 is a cross section of a unit using a closed type rotor and also using a regenerator.

In FIG. 5, a rotor with a regenerator is shown, and also the rotor shaft is arranged such as to make it possible to keep it stationary if desired. 50 is rotor supported by bearings 56 and 63 and shaft 57. Vanes 51 may be radial or may be curved as desired, and vanes 54 are curved in manner similar to vanes 33 in FIG. 4. 52 is regenerative heat exchanger exchanging heat between working fluid streams in passages 53 and 61. Heat supply heat exchanger 55 and cooling heat exchanger 62 are attached to the shaft, so that the shaft may be kept stationary or rotated at a different speed than the rotor 50. 58 and 59 are entry and exit for heating fluid and 64 and 65 are entry and exit for cooling fluid. 66 is opening.

In operation, the rotor rotates, and a working fluid within the rotor passes outward in passage 11, and is compressed by centrifugal force, and accelerated to a tangential speed that may be the same as that for the rotor periphery. In a closed rotor such as is shown in FIG. 1, heat is added into the working fluid near rotor periphery, and then the working fluid decelerated in the fluid passages 14 extending inward toward rotor center, with the passages being curved backward away from the direction of rotation as shown in FIG. 2. As the working fluid is decelerated in the inward extending passages, the work associated by such deceleration is transferred into the rotor and this provides the thrust and torque to rotate the rotor. After deceleration and expansion, the working fluid is cooled in heat exchanger 15 and then passed to the outward extending passages thus completing its working cycle.

The operation of the unit of FIG. 3 is similar, except that the working fluid enters the rotor via opening 37 from external sources. For the unit shown in FIG. 3, the heat addition heat exchanger is omitted; for this unit, there is a pressure drop between entry 37 and exit 34. A heat exchanger similar to that shown in FIG. 1, item 12, may be used in the unit of FIG. 3, and then the entry and exit pressure for the working fluid may be the same, if desired.

The operation of the unit shown in FIG. 5, is similar to that described for the other units. The rotor rotates, and compresses by centrifugal force the working fluid in passages 51, and then the working fluid gains heat in the regenerative heat exchanger, with the being supplied by another working fluid stream returning from the high temperature end of the unit; the working fluid is expanded and decelerated in passages 54 and heat is added in heat exchanger 55. Then the working fluid passes through the regenerative heat exchanger and then is cooled in cooling heat exchanger and then is passed into passages 51 thus completing it cycle.

The various components of the units shown can be exchanged to make additional forms of the apparatus. As noted, the unit of FIG. 3 may be provided with a heat exchanger similar to that shown in FIG. 1 for adding heat into the working fluid near the rotor periphery. Further, a regenerator may be provided with the units of FIG. 1 and FIG. 3, if desired, between the outward extending and the inward extending working fluid passages. Also, the cooling coil of FIG. 5, item 62 may be eliminated, and the working fluid taken into the unit from outside the unit, if desired.

The openings 32, 13 and 66 may be made into nozzles, if desired, and the nozzle oriented in different directions as desired. In particular, these nozzles may be oriented to discharge the working fluid tangentially backward, if desired.

The regenerator of FIG. 5 is shown to be tapered. This taper may be as shown, or the taper may be made such that the regenerator portion diameter is smaller in the end having heat exchanger 55, than in the end having heat exchanger 62. Also, the regenerator may be made without taper.

The passages 53 and 61 are usually provided with vanes, as indicated in FIG. 5, to prevent tangential movement of the working fluid.

Applications for this power generator are those normally encountered in power generation.

The working fluid is usually a gas for units such as shown in FIG. 1 and 5, but the working fluid may also be a liquid for a unit such as shown in FIG. 3. The heating and cooling fluids may be either gases or liquids, as desired.

The heat exchangers for heating and cooling are shown to be made of finned tubing. Other forms of heat exchangers for adding heat and for removing heat may be used. The regenerative heat exchanger is shown to be made of sheet metal; other forms of heat exchangers may be also used.

I claim:

1. In a power generating turbine, wherein a working fluid is accelerated and pressurized within a rotating rotor first outwardly extending passages, and wherein a working fluid is expanded within a rotating rotor inwardly extending second passages, with the first and the second passages being connected at their outward ends by a passage means to allow said working fluid to flow outwardly within the first passage and through said passage means and inwardly within the second passage, the improvement comprising:
   a. a curved inwardly extending second passage, for the generation of thrust and torque on said rotating rotor, with the curvature of said curved inwardly extending passage being backward and away from the direction of rotation.

2. The turbine of claim 1 wherein a heating heat exchanger is provided to add heat into said working fluid near said passage means.

3. The turbine of claim 2 wherein the rotor of the turbine is closed and said working fluid is sealed therein, and wherein a cooling heat exchanger is provided within the rotor to remove heat from the working fluid near rotor center, and where the inner ends of the first passages and the second passages are connected and adapted for circulation of said working fluid.

4. The turbine of claim 3 wherein a regenerative heat exchanger is provided to exchange heat between two streams of the working fluid, one of the streams being before the heat addition heat exchanger and another being after the heat addition heat exchanger, and where said regenerative heat exchanger is carried by the rotor.

5. The turbine of claim 4 wherein said heating heat exchanger is mounted on the rotor shaft, and said shaft is held stationary.

* * * * *